United States Patent [19]
Reed

[11] Patent Number: 5,123,460
[45] Date of Patent: Jun. 23, 1992

[54] MULTI-PURPOSE CONTAINER SYSTEM FOR LOADING LIQUID DISPENSER

[75] Inventor: David A. Reed, Nutley, N.J.

[73] Assignee: American Cyanamid Company, Stamford, Conn.

[21] Appl. No.: 458,329

[22] Filed: Dec. 28, 1989

[51] Int. Cl.$^5$ ............................. B65B 1/30; B65D 1/24
[52] U.S. Cl. ........................................ 141/95; 141/320;
141/98; 220/23.4; 220/23.86; 222/158; 73/427;
215/1 C
[58] Field of Search ................. 220/23.4, 23.83, 23.86;
222/157, 158, 566, 544; 141/319, 320, 94, 95,
98, 392; 73/426, 427; 215/1 C, 1 R, 365;
206/223; D9/367, 370, 387, 373, 375

[56] References Cited

U.S. PATENT DOCUMENTS

| | | | |
|---|---|---|---|
| D. 212,212 | 9/1968 | Tompkins | D9/373 |
| D. 289,975 | 5/1987 | Wendt | D9/370 |
| 3,225,951 | 12/1965 | Poston et al. | 215/1 C |
| 3,493,146 | 2/1970 | Conners et al. | 222/566 |
| 3,658,204 | 4/1972 | Bottger | 220/23.86 |
| 4,105,142 | 3/1991 | Morris, Jr. | 222/158 |
| 4,292,846 | 10/1981 | Barnett | 73/427 |
| 4,573,595 | 3/1986 | Mednis | 215/1 C |
| 4,832,211 | 5/1989 | Matthews et al. | 215/365 |
| 4,925,066 | 5/1990 | Rosenbaum | 222/158 |

FOREIGN PATENT DOCUMENTS

| | | | |
|---|---|---|---|
| 865810 | 2/1953 | Fed. Rep. of Germany | 222/158 |
| 1328639 | 12/1963 | France | 141/319 |
| 2633907 | 1/1990 | France | 220/23.83 |

Primary Examiner—Henry J. Recla
Assistant Examiner—Keith Kupferschmid
Attorney, Agent, or Firm—Mark P. Stone

[57] ABSTRACT

A container system is provided for storing, transporting, measuring and loading liquid into dispenser equipment. A predetermined quantity of liquid is stored within a first larger container having gradings or markings for visually observing the quantity of liquid in the container. A lower discharge outlet is provided for selectively discharging liquid from the first container. A second smaller container, also including gradings or markings for visually observing the quantity of liquid within the second container, is removably mounted to the outer surface of the first container. A spray nozzle for metering and controlling the quantity of liquid to be discharged from the first larger container may be stored within the smaller second container when not in use. The container system enables a user to transport both a larger and smaller container, and a discharge nozzle, as a single assembled unit. The components of the system which may be disassembled and selectively used for different operations including measurement of liquid contents at different degrees of precision.

23 Claims, 2 Drawing Sheets

MULTI-PURPOSE CONTAINER SYSTEM FOR LOADING LIQUID DISPENSER

BACKGROUND OF THE INVENTION

The present invention is directed to a container system, and in particular to containers for storing, measuring, transporting and discharging materials, particularly liquids. The system is particularly useful for loading agricultural dispensing equipment with liquid agricultural treatment material to be applied to a field.

The quantity of treatment material to be dispensed from agricultural equipment is measured at various degrees of precision before it is loaded into the dispensing equipment. The quantity of liquid material loaded into the dispensing equipment will vary with the type of material to be dispensed, the concentration of the liquid desired, the area to be treated, and the type of application or treatment to be performed. For certain treatment operations, the precision of the measurement of the quantity of liquid loaded in the dispensing equipment is not significant, while for other operations the precision of the measurement is of importance.

It is an object of the present invention to provide a container system in which the precision of the measurement of liquid material loaded into dispensing equipment can be selectively controlled by the user during the loading operation. It is a further object of the invention to provide a container system having several different components assembled together to be transported as a single unit, and in which the separate assembled components may be removed from each other for selected use during different loading operations.

Other objects and advantages of the container system of the present invention will become apparent from the following discussion.

SUMMARY OF THE INVENTION

The container system of the present invention includes a first larger container and a second smaller container removably mounted thereon. Each of the containers includes gradings or other visible indicia enabling the contents of liquid within the respective containers to be readily ascertained upon visual inspection. The first container includes a discharge port defined proximate to the bottom of the container, and a cap is removably mounted thereon for selectively covering and uncovering the discharge outlet. The second container is removably mounted in an upright position to a portion of the outer surface of the first container, and includes an opening defined in the top surface thereof. The second container may be used as a storage receptacle for liquid metering dispensing means, such as a valve controlled spray nozzle, which may be selectively mounted over the discharge outlet of the first container in lieu of the cap covering that discharge outlet.

In operation of the container system, liquid material to be dispensed from the first container may be discharged by gravity feed directly through the discharge outlet by removing the cap covering the outlet. The quantity of material discharged in this manner may be visually observed from the gradings provided on the outside of this container. When more sensitive or accurate measurement of the quantity of the discharged liquid is required, the cap may be replaced with the valve means stored within the second container for more precisely controlling the rate of discharge flow from the first container. Liquid may be discharged from the first container in either of the above manners directly into an intended reservoir (e.g. into agricultural application equipment), or into the second smaller container which can be dismounted from the first container and positioned to receive the flow of material through the discharge outlet of the first container. The quantity of liquid discharged from the first container into the second container will be more precisely measured because the measurement markings provided on the second container are more precise than the markings on the first container.

The container system of the present invention enables the user to selectively control the rate of discharge and the precision of measurement of the quantity of material discharged from the first container in several different ways, depending upon the nature of the project. The components of the container system are adapted to be as removably assembled together so that the container system may be conveniently transported as a single unit and thereafter disassembled to adapt the system to a particular project as may be desired.

DISCUSSION OF THE BEST MODES FOR CARRYING OUT THE INVENTION

Figure 1:
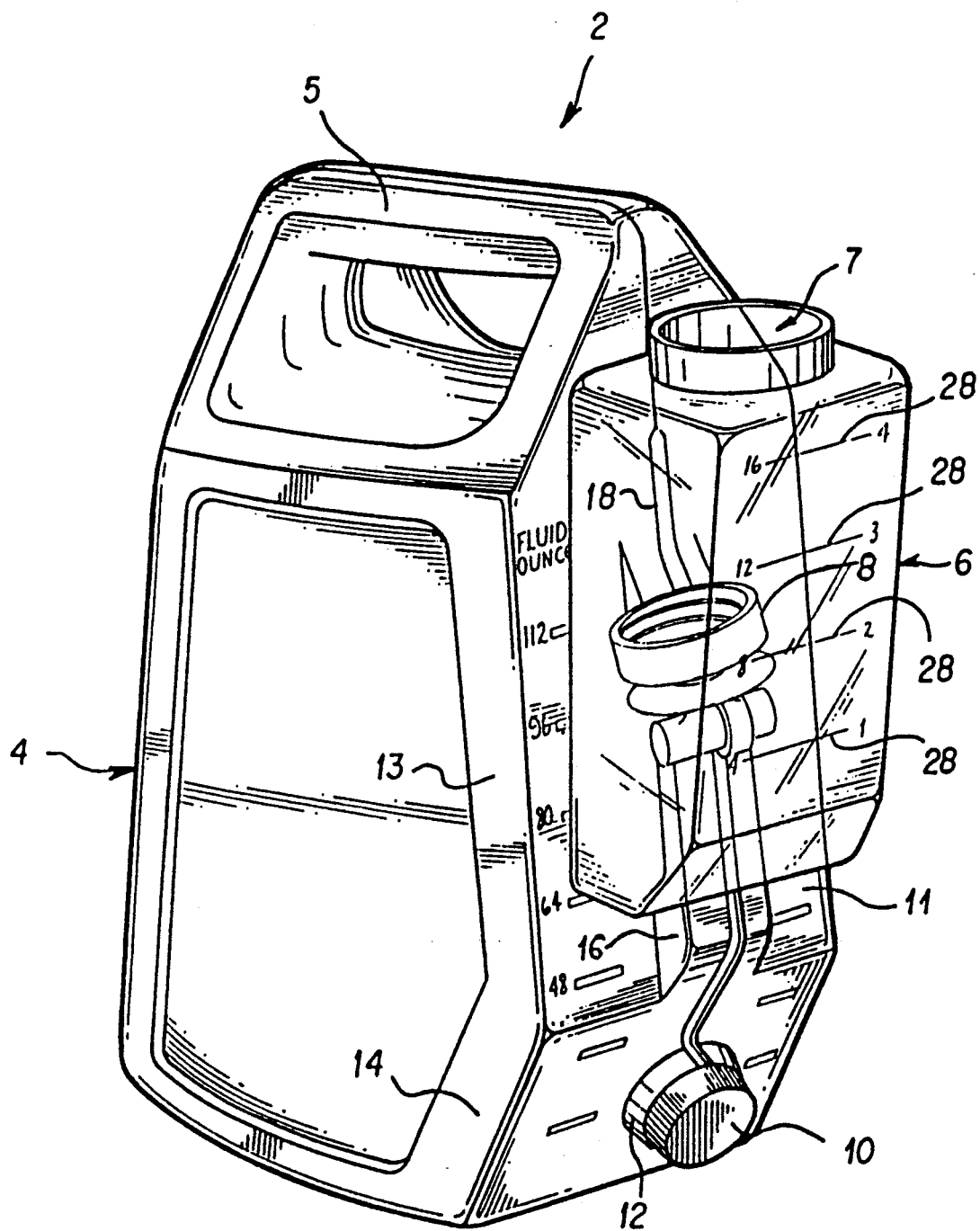
FIG. 1 of the drawing illustrates the container system of the present invention in which the different components of the system are mounted together as a single unit.
Figure 2:
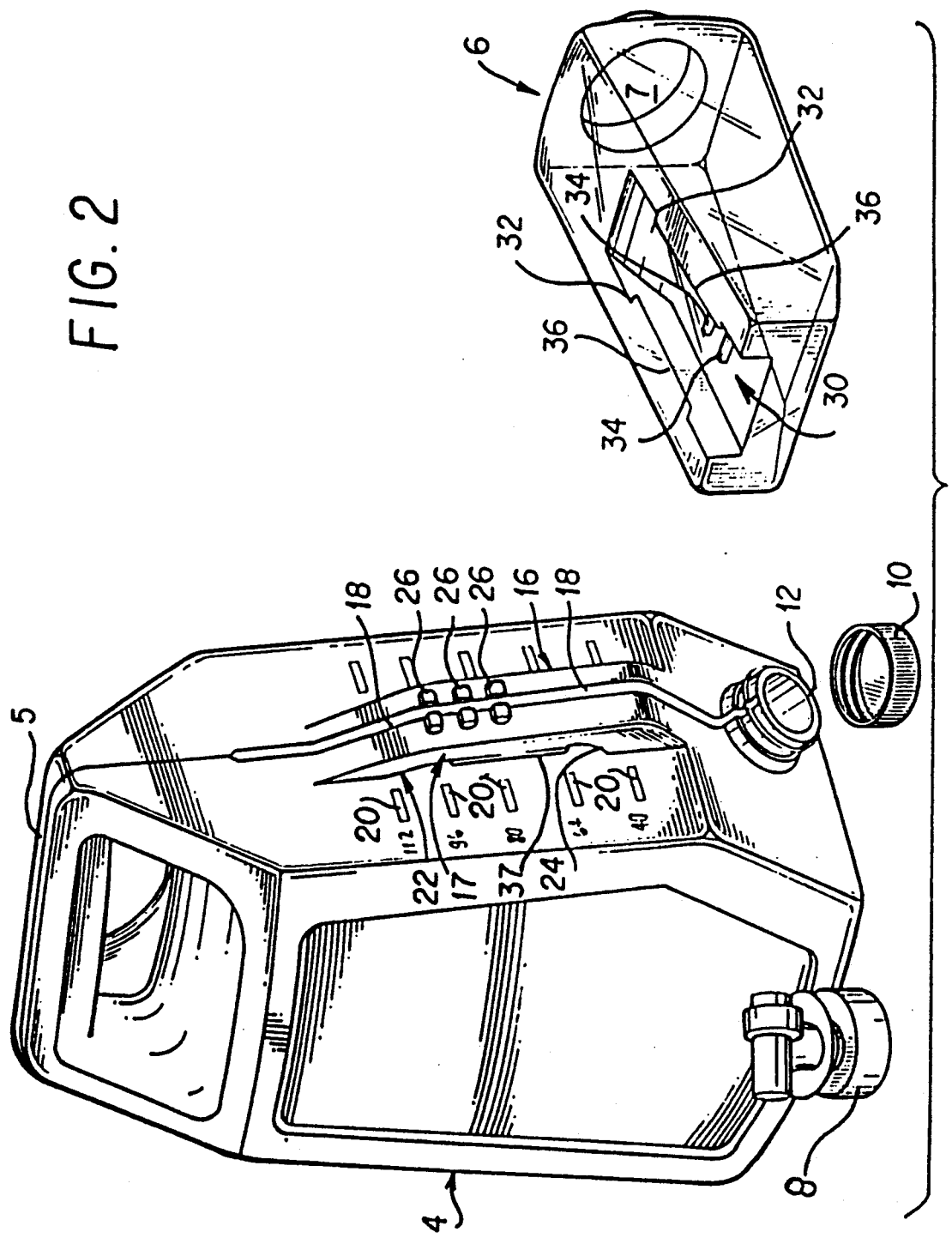
FIG. 2 of the drawing illustrates the container system of FIG. 1 in which the components of the system have been disassembled from each other.

FIGS. 1 and 2 of the drawing illustrate the preferred embodiment of the container system in accordance with the present invention. Although the system may be advantageously used for loading predetermined quantities of liquid agricultural treatment material into agricultural dispensing equipment, it will be apparent that the container system may be used for a wide variety of applications where different degrees of precision of measurement of the quantity of liquid contents to be discharged from the system may be required.

As illustrated by FIGS. 1 and 2, the basic components of the container system, generally designated by the reference numeral 2, include a larger container 4, a smaller container 6, a discharge valve (with a mechanical coupling) 8, and a cap 10 removably mounted to a discharge outlet or nozzle 12 defined on the container 4. The container 4 is preferably formed from a plastic material and includes a handle portion 5 integrally defined at the top of the container to enable a user to both transport the container and easily manipulate the container to pour the liquid contents through the discharge nozzle 12 by the gravity feed.

The container 4 includes a front end 11 which is generally vertically oriented relative to the bottom of the container. The vertical portion of the front end 11 is designated by reference numeral 13. The lower portion of front surface 11 includes an inwardly angled surface, designated by reference numeral 14, extending downwardly from the vertical surface 13. The discharge nozzle 12 of the container 4 is defined on the inwardly angled surface area 14 proximate to the center thereof. The angle of inclination of surface area 14 relative to surface area 13 is approximately 45° in the illustrated embodiment of the invention. As also illustrated, the discharge nozzle 12 extends downwardly and is oriented substantially perpendicular to the inclined surface 14. Providing the discharge nozzle 12 on the angled portion 14 facilitates the discharge of liquid material from the container by gravity feed.

A portion of the vertical surface 13 of the front end 11 of the container 4 defines a raised area or projection 16 extending vertically through the approximate center of the front end 11. The upper portion 22 of the projection 16 is ramp shaped, and the lower portion 17 of the projection 16 is leveled. Three ribs 26 extend outwardly from the level portion 17 of the projection 16, and a pair of shoulders 24 is defined to the sides of the level portion 17 of the projection 16, approximately midway down the level portion.

The front end 11 of the container 4 is formed, in part, from a transparent material which is illustrated by strip 18. The strip 18 extends vertically down the center of the front side 11, substantially throughout the entire length of the front side, and terminates on the periphery of the discharge nozzle 12. A plurality of horizontal indicating lines 20 are defined on the front end 11 of the container 4 and are oriented perpendicular to the transparent strip 18 on both sides of the strip. The indicating lines 20 are visual scales which represent the content of liquid within the container 4. Accordingly, the user of the container system may visually observe and determine the contents within the container 4 through the transparent strip 18 and the scales 20, and may readily determine the quantity of liquid discharged from the container by recording the contents in the container prior to and subsequent to the discharge of liquid therefrom.

The container 6 is a smaller container having a capacity of approximately 16 fluid oz. (The larger container 4 may have a capacity exceeding 112 fluid oz.) The smaller container 6 may be formed from a plastic material, and preferably, is entirely transparent. The front surface of the container 6 has a plurality of indicating lines or scale markings 28 which enable the user of the system to visually observe the liquid contents within this smaller container. The scale lines, in addition to representing the absolute liquid content of the contained liquid, may also provide an alternative indication representing the acreage of land over which the liquid contents within the container is to be applied when the container system is used for agricultural application purposes.

The rear surface of the container 6 defines an indentation 30 having both a ramp shaped portion and a level portion which complement the shape of the raised projection 16 on the front end 11 of the larger container 4. The indentation 30 on the smaller container 6 further defines a pair of shoulders 32 complementing the configuration of the pair of shoulders 24 defined on the raised projection 16 of the larger container 4. Two horizontally oriented ribs 34 extend outwardly from the level portion of the indentation 30, and two opposed ledges 36 extend vertically downwardly along opposed sides of the level area of the indentation 30. The ledges 36 are adapted to engage corresponding ledges 37 defined on the opposed sides of the level portion 17 of the projection 16 on the container 4.

The container 6 has an opening 7 defined on its upper surface. This opening is sufficiently large enough to receive both the discharge valve 8 and the cap 10 therethrough.

The cap 10 is a conventional cap which has internal screw threads adapted to engage complementary external screw threads on the outer surface of discharge nozzle 12 of the container 4. The discharge valve (and coupling) 8 is adapted to selectively replace the cap 10 on the discharge nozzle. The mechanical coupling of the discharge valve is of the same dimension as the cap 10 and includes similar internal threading so that it may be removably mounted to the outer surface of the discharge nozzle in place of the cap 10. The valve element and coupling 8 is provided as a single piece, and the valve element is rotatable relative to the coupling so that the direction of discharge of liquid from the container through the valve may be varied or adjusted by the user. The valve includes conventional means, such as a spring biased plunger, to enable the user to selectively open the valve to discharge a predetermined quantity of liquid from the container at a desired rate of flow.

The container system described above provides the user with different alternative ways for dispensing a predetermined quantity of liquid material measured at different degrees of precision, as required by the nature of the project.

As illustrated by FIG. 1 of the drawing, the container system is shown with all components assembled together in a single unit. The system will be assembled in this manner, for example, when the container 4 is carrying liquid and the system is being transported to a location for application of the liquid. In this transport or storage mode of operation, the cap 10 is mounted over the discharge nozzle 12 of the container 4, the smaller container 6 is removably mounted to the projection 16 of the larger container 4, and the discharge valve and coupling 8 is stored within the smaller container 6. The container 6 is removably mounted to the container 4 by sliding the indented portion 30 defined on the rear surface of the container 6 downwardly along the complementary projection 16 on the front end 11 of the container 4 until the projection 16 is fully received within the indentation 30. The complementary shoulders 24 and 32 on the containers 4 and 6, respectively, act as stops to prevent any further downward movement of the container 6 relative to the container 4 once the projection 16 is fully received within the indentation 30. The complementary ledges 36 and 37 defined on the sides of the indentation 30 and the projection 16 act as guides for the relative motion between the container 6 and the projection 16. When the container 6 is properly mounted in position on the projection 16, the ribs 34 extending from the indentation 30 on the container 6 are disposed in the vertical spaces defined between the ribs 26 on the projection 16 to further secure the container 6 to the container 4. When the container 6 is removed from the container 4, the container 6 is slid vertically upwardly relative to the container 4 until the indentation 30 is completely disengaged from the projection 16.

When discharge of liquid from the container 4 is desired, the cap 10 can be removed from the discharge nozzle 12 and liquid will flow through the nozzle by gravity feed. The quantity of liquid discharged, and the discharge flow rate, may be controlled by manual manipulation of the position of the container 4 (e.g., the container may be tilted backwards from the front end 11 to reduce or prevent flow from the discharge outlet even when the cap 10 is removed). By visually observing the contents of the container through the transparent strip 18 both before and after the discharge of liquid, the quantity of discharged liquid may be readily determined. If more precise control and measurement of the quantity of discharged liquid is required, the cap 10 may be replaced by the discharge valve 8. The discharge valve may be mounted to the discharge nozzle either before the container 4 is filled with liquid material to be dispensed, or after the container is filled with liquid provided that the container is tilted backward during the replacement operation to prevent inadvertent leakage of liquid through the discharge nozzle. Either the discharge valve 8, the cap 10, or both, may be stored in the smaller container 6 when liquid is being discharged directly from the larger container 4.

If more precise measurement of the quantity of liquid discharged from the container 4 is desired, the smaller container 6 may be dismounted and positioned below the discharge nozzle 12 of the container 4. Liquid from the container 4 can be discharged directly into container 6 by gravity feed by removing the cap 10 from the container 4. In the alternative, the cap 10 may be replaced with the valve and coupling 8, and the liquid from the container 4 can be discharged into the smaller container 6 by manually controlling the valve. Preferably, liquid will be discharged into the smaller container 6 when the quantity of discharged liquid is required to be more precisely controlled and measured since the measurement scale lines on the container 6 are more precise and well defined than the measurement scale lines on the larger container 4. The valve element 8 will be used during the discharge operation when more precise control of the flow rate of liquid discharged from the container 4 is desired.

The control of the flow of liquid through the discharge outlet 12 of the container 4 is enhanced by providing the discharge outlet on the angled surface 14 of the front end 11 of the container. This positioning facilitates the discharge of liquid by gravity feed when the container 4, particularly when the container is manually manipulated or tilted by the user. The orientation of the discharge nozzle 12, which extends outwardly and downwardly from the angled surface 14 of the front end 11 of the container 4, also adds mechanical stability to the container to prevent it from tilting forward when it is standing upright on a supporting surface.

The container system described above is advantageous in many respects. The system provides means for both storing and transporting a plurality of containers as a single unit. The system further provides alternative means for both controlling the rate of flow of discharged liquid, and measuring and controlling the quantity of the discharged liquid, depending upon the precision of these parameters required by a particular project. As discussed above, if the flow rate of liquid from the container 4 is critical, the valve 8 may be employed to more precisely control the flow. Otherwise, the discharge flow may be controlled by manually manipulating the container. Likewise, if the quantity of discharged liquid is critical, the liquid may be initially discharged from the container 4 (with or without use of the valve 8) into the smaller container 6 where a more precise measurement of the liquid can be made before it is applied to a further use. Otherwise, the quantity of liquid discharged from the container 4 may be roughly estimated by visually observing the measurement scale lines on the container 4 itself. The angular orientation of the lower portion of the front end 11 of the container 4 on which the discharge nozzle is defined advantageously facilitates the discharge of liquid from the container and the manipulation of the container itself.

The container system of the present invention is particularly adapted to the application of liquid agricultural treatment material into agricultural dispensing machinery. The quantity of liquid material introduced into the dispensing machinery for a desired treatment operation is measured and controlled by the container system of the present invention. However, the container system may also be employed for any operation in which a predetermined quantity of liquid material to be discharged from a storage container is required to be metered and measured at varying degrees of precision.

Other advantages, features, and modifications of the present invention will become apparent to those skilled in the art. Accordingly, the discussion of the preferred embodiment of the container system herein has been intended to be illustrative only, and not restrictive of the scope of the invention, that scope being defined by the following claims and all equivalents thereto.

I claim:

1. A container system for discharging liquid and measuring the quantity of said discharged liquid, said container system comprising:
   a first container for holding a liquid, first means on said first container for measuring the quantity of liquid therein, and a discharge outlet defined in said first container,
   a second container selectively and removably mounted to said first container for receiving liquid from said first container during normal use of said container system, said second container including second means for measuring the quantity of liquid therein, said second means for measuring being more precise than said first means for measuring,
   valve means for controlling the discharge of liquid from said discharge means on said first container, said valve means being selectively and removably mounted on said discharge outlet in a first operational position during normal use of said container system, and said valve means being stored within said second container and disconnected from said discharge outlet when not in use,
   said first container, said second container, and said valve means being selectively assembled into a single unit.

2. The system as claimed in claim 1 wherein said second container is adapted to be removed from said first container and positioned to receive liquid discharged from said first container.

3. The system as claimed in claim 1 further including a cap removably mounted on said discharge outlet of said first container, said removable cap being selectively replaced by said valve means when said valve means is in said first operational position.

4. The system as claimed in claim 1 wherein said first and second means on said first and second containers for measuring the quantity of liquid therein each include a transparent portion on said first and second containers, and visible indicia proximate to said respective transparent portions.

5. A container system for measuring and discharging predetermined quantities of liquid, said system comprising:
   a first container for holding a liquid, said first container including first means for measuring the quantity of liquid therein, and means for discharging said liquid therefrom, said means for discharging including valve means selectively and removably mounted on a discharge outlet during normal use of said container system, a second container selectively and removably mounted to said first container for receiving liquid from said first container during normal use of said container system, said second container including second means for measuring the quantity of liquid therein, said second means for measuring being more precisely scaled than said first means for measuring, said second container adapted to be removed from said first container to receive liquid discharged from said first container in an operational position, and said second container adapted to receive and store said valve means in a storage position mounted to said first container when said valve means are disconnected from said discharge outlet and are not in use, said first container, said second container and said valve means adapted to be selectively assembled into a single unit.

6. The system as claimed in claim 5 wherein said first container includes a front end, the lowermost portion of said front end being inwardly inclined relative to the bottom of said first container, said discharge outlet in said first container being defined on said inclined portion of said front end.

7. The system as claimed in claim 5 wherein said first and second means on said first and second containers for measuring the quantity of liquid therein each include a transparent portion on said first and second containers, and visible indicia proximate to said respective transparent portions.

8. A container system for dispensing liquid in controlled quantities, said container system comprising:

a first container for holding a liquid to be discharged therefrom, said first container including a transparent portion for visually observing the quantity of liquid therein, said first container having means proximate to said transparent portion thereof for measuring the quantity of said liquid within said first container, discharge means on said first container for selectively discharging a predetermined quantity of said liquid from said first container, said discharge means on said first container including a discharge outlet and valve means selectively and removably mountable on said discharge outlet during normal use of said container system, and a second container, and means on said first container for selectively removably mounting said second container onto said first container to receive liquid from said first container during normal use of said container system, said second container being adapted to store said valve means when said valve means is disconnected from on said discharge outlet of said first container.

9. The system as claimed in claim 8 wherein said transparent portion is a vertical strip defined on a first surface of said first container.

10. The system as claimed in claim 9 wherein said discharge outlet is defined on said first surface of said first container.

11. The system as claimed in claim 9 wherein said first surface of said first container includes an upper portion which is oriented substantially transverse to the bottom of said first container, and a lower portion which is inclined inwardly and downwardly towards said bottom of said container.

12. The system as claimed in claim 11 wherein said discharge outlet is defined on said inwardly inclined portion of said first surface of said first container.

13. The system as claimed in claim 12 wherein said discharge outlet is a nozzle oriented substantially perpendicularly to said inclined portion of said first surface of said first container.

14. The system as claimed in claim 8 wherein said means for measuring the quantity of said liquid in said first container includes a plurality of visible markings on said first surface of said first container, each of said visible markings corresponding to different quantities of liquid within said first container, said visible markings being oriented substantially transverse to said vertical transparent strip.

15. The system as claimed in claim 8 wherein said second container is adapted to receive liquid discharged from said first container, said second container including means for visually observing and determining the quantity of said liquid therein discharged from said first container, and said means for observing and determining the quantity of said liquid in said second container is more precisely calibrated than said means for measuring the quantity of said liquid in said first container.

16. A container system for dispensing liquid in controlled measured quantities, said system comprising:

a first container for holding a liquid to be discharged therefrom, said first container including a transparent portion for visually observing the quantity of liquid therein, said first container having means proximate said transparent portion thereof for measuring the quantity of said liquid within said first container, discharge means on said first container for selectively discharging a predetermined quantity of liquid from said first container, said discharge means on said first container including a discharge outlet and a cap removably mountable on said discharge outlet, a second container, and means on said first container for selectively and removably mounting said second container onto said first container for receiving liquid from said first container during normal use of said container system, said second container being adapted to store said cap when said cap is not mounted on said discharge outlet of said first container.

17. The system as claimed in claim 16 wherein said transparent portion is a vertical strip defined on a first surface of said first container.

18. The system as claimed in claim 17 wherein said means for measuring the quantity of said liquid in said first container includes a plurality of visible markings on said first surface of said first container, each of said visible markings corresponding to different quantities of liquid within said first container, said visible marking being oriented substantially transverse to said vertical transparent strip.

19. The system as claimed in claim 16 wherein said discharge outlet on said first container is defined in a first surface of said first container.

20. The system as claimed in claim 16 wherein a first surface of said first container includes an upper portion which is oriented substantially transverse to the bottom of said first container, and a lower portion which is inclined inwardly and downwardly towards the bottom of said first container.

21. The system as claimed in claim 20 wherein said discharge outlet is defined on said inwardly inclined portion of said first surface of said first container.

22. The system as claimed in claim 21 wherein said discharge outlet is a nozzle oriented substantially perpendicularly to said inclined portion of said first surface of said first container.

23. The system as clamed in claim 16 wherein said second container is adapted to receive liquid discharged from said first container, said second container including means for visually observing and determining the quantity of said liquid therein discharged from said first container, said means for observing and determining the quantity of said liquid in said second container being more precisely calibrated than said means for measuring the quantity of said liquid in said first container.

* * * * *

UNITED STATES PATENT AND TRADEMARK OFFICE
CERTIFICATE OF CORRECTION

PATENT NO. : 5,123,460
DATED : June 23, 1992
INVENTOR(S) : David A. Reed

It is certified that error appears in the above-identified patent and that said Letters Patent is hereby corrected as shown below:

Column 7, Line 58 (Claim 8, Line 24): Delete "on".

Column 8, Line 11 (Claim 14, Line 1):Delete "claim 8" and substitute - -claim 9- -.

Column 8, Line 59 (Claim 18, Line 6): Delete "marking" and substitute - -markings- -.

Signed and Sealed this

Twenty-fourth Day of August, 1993

Attest:

BRUCE LEHMAN

*Attesting Officer*  *Commissioner of Patents and Trademarks*